United States Patent
Whalley et al.

(10) Patent No.: US 9,977,585 B2
(45) Date of Patent: May 22, 2018

(54) PREDEFINING ELEMENTS OF A CEMENTED WELLBORE

(71) Applicant: Landmark Graphics Corporation, Houston, TX (US)

(72) Inventors: Andrew James Whalley, Calgary (CA); Peter Gosling, Calgary (CA); Gustavo Adolfo Urdaneta, Houston, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 229 days.

(21) Appl. No.: 14/917,405

(22) PCT Filed: Oct. 8, 2013

(86) PCT No.: PCT/US2013/063903
§ 371 (c)(1),
(2) Date: Mar. 8, 2016

(87) PCT Pub. No.: WO2015/053755
PCT Pub. Date: Apr. 16, 2015

(65) Prior Publication Data
US 2016/0224228 A1    Aug. 4, 2016

(51) Int. Cl.
| | |
|---|---|
| G06F 3/0484 | (2013.01) |
| E21B 33/13 | (2006.01) |
| E21B 47/00 | (2012.01) |
| E21B 41/00 | (2006.01) |
| G06F 3/0482 | (2013.01) |
| G06F 3/0486 | (2013.01) |

(52) U.S. Cl.
CPC .......... *G06F 3/04847* (2013.01); *E21B 33/13* (2013.01); *E21B 41/0092* (2013.01); *E21B 47/0005* (2013.01); *G06F 3/0482* (2013.01); *G06F 3/0486* (2013.01); *G06F 3/04842* (2013.01)

(58) Field of Classification Search
CPC combination set(s) only.
See application file for complete search history.

(56) References Cited

U.S. PATENT DOCUMENTS

| | | | |
|---|---|---|---|
| 4,794,534 A | 12/1988 | Millheim | |
| 8,214,186 B2 | 7/2012 | Cuevas et al. | |
| 2001/0042642 A1 | 11/2001 | King | |
| 2008/0183451 A1 | 7/2008 | Weng et al. | |
| 2013/0124178 A1* | 5/2013 | Bowen ............... | G06F 17/5009 703/10 |
| 2014/0105446 A1* | 4/2014 | Maxey ............... | G01N 33/2823 382/100 |

FOREIGN PATENT DOCUMENTS

WO    023262 A2    1/2002

OTHER PUBLICATIONS

International Search Report and Written Opinion; PCT Application No. PCT/US2013/063903; dated Jul. 7, 2014.

* cited by examiner

*Primary Examiner* — Rashawn N Tillery
(74) *Attorney, Agent, or Firm* — Polsinelli PC

(57) ABSTRACT

Systems and methods for predefining elements of a cemented wellbore using a graphical user interface comprising various elements for cementing the wellbore and a schematic view of the wellbore and tubing string.

20 Claims, 3 Drawing Sheets

PREDEFINING ELEMENTS OF A CEMENTED WELLBORE

CROSS-REFERENCE TO RELATED APPLICATIONS

This application claims the priority of PCT Patent Application No. PCT/US13/63903, filed on Oct. 8, 2013, which is incorporated herein by reference.

STATEMENT REGARDING FEDERALLY SPONSORED RESEARCH

Not applicable.

FIELD OF THE DISCLOSURE

The present disclosure generally relates to systems and methods for predefining elements of a cemented wellbore. More particularly, the present disclosure relates to predefining elements of a cemented wellbore using a graphical user interface comprising various elements for cementing the wellbore and a schematic view of the wellbore and tubing string.

BACKGROUND

Typical elements required for cementing a wellbore may include various fluids, which are constrained to different areas within the wellbore and tubing string. Other elements may include a top plug and float collar for constraining the various fluids. Conventional techniques for cementing a wellbore require an iterative manual entry of each fluid and its volume in a table or spreadsheet, which may need to be adjusted, until the desired result is achieved. This approach lacks any visual representation of the desired result and often requires multiple time-consuming adjustments before the desired result is achieved.

BRIEF DESCRIPTION OF THE DRAWINGS

The present disclosure is described below with references to the accompanying drawings in which like elements are referenced with like reference numerals, and in which.

DETAILED DESCRIPTION OF THE PREFERRED EMBODIMENTS

Figure 1:
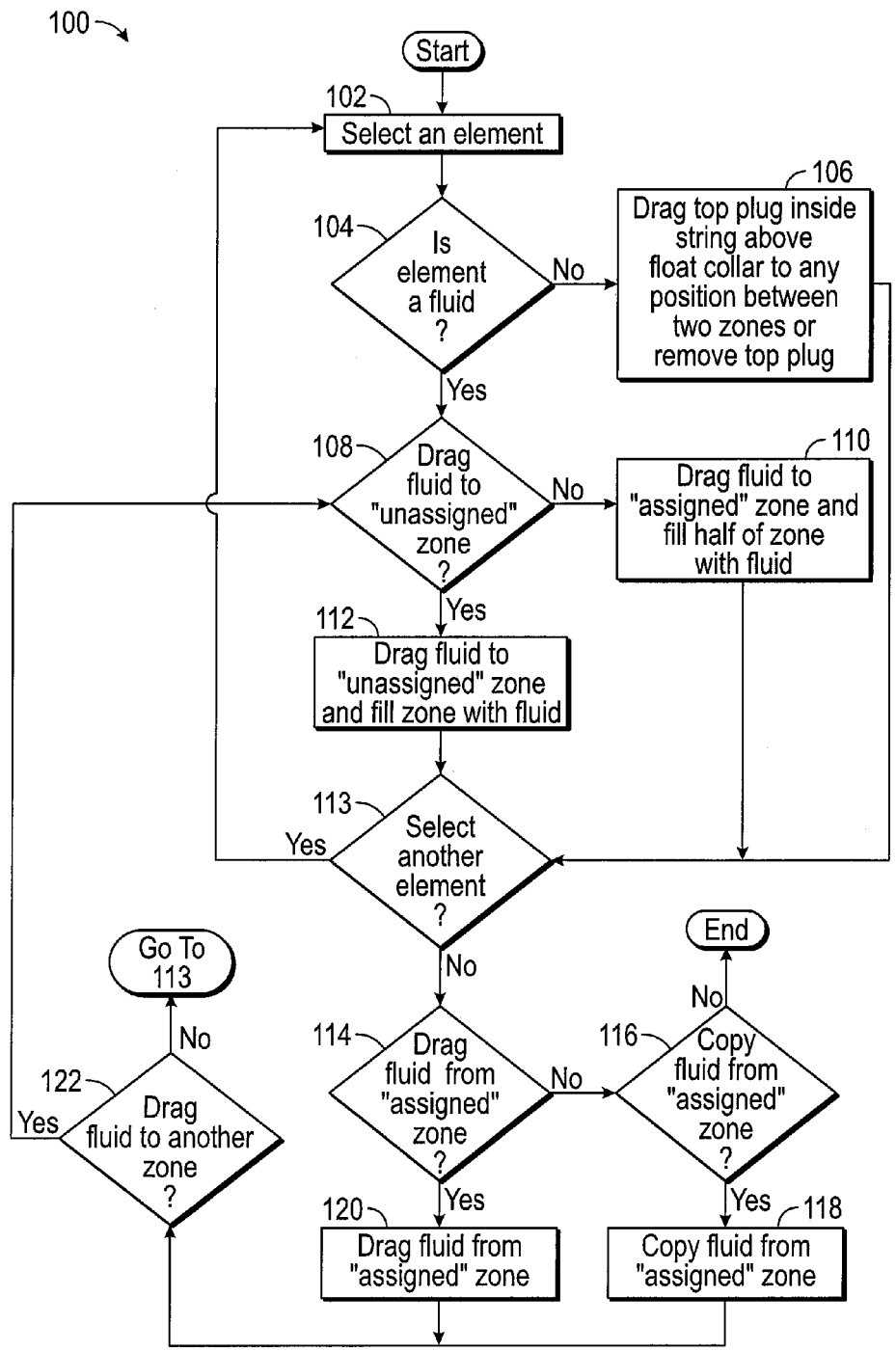
FIG. 1 is a flow diagram illustrating one embodiment of a method for implementing the present disclosure.

The present disclosure therefore, overcomes one or more deficiencies in the prior art by providing systems and methods for predefining elements of a cemented wellbore using a graphical user interface comprising various elements for cementing the wellbore and a schematic view of the wellbore and tubing string.

In one embodiment, the present disclosure includes a method for predefining elements of a cemented wellbore, comprising: a) selecting a fluid from a key comprising multiple fluids using a graphical user interface; b) dragging the fluid from the key to one of a plurality of zones within a schematic view of a wellbore and a tubing string using the graphical user interface; and c) filling the one of the plurality of zones with the fluid or filling half of the one of the plurality of zones with the fluid using a computer processor.

In another embodiment, the present disclosure includes a non-transitory program carrier device tangibly carrying computer executable instructions for predefining elements of a cemented wellbore, the instructions being executable to implement: a) selecting a fluid from a key comprising multiple fluids using a graphical user interface; b) dragging the fluid from the key to one of a plurality of zones within a schematic view of a wellbore and a tubing string using the graphical user interface; and c) filling the one of the plurality of zones with the fluid or filling half of the one of the plurality of zones with the fluid.

In yet another embodiment, the present disclosure includes a non-transitory program carrier device for carrying a data structure, the data structure comprising: i) a first data field comprising a schematic view of a wellbore and a tubing string, wherein the schematic view comprises: a) a first zone defined as an area within the tubing string from a top of the tubing string to a float collar; b) a second zone defined as an area within the tubing string below the float collar and within an annulus between the tubing string, the wellbore and casing up to a predetermined top of cement; and ii) a third zone defined as an area within another annulus between the tubing string and the casing from the top of cement to a top of the another annulus; and a second data field comprising a key with multiple fluids, wherein the multiple fluids are coded to distinguish each fluid by type and density.

The subject matter of the present disclosure is described with specificity, however, the description itself is not intended to limit the scope of the disclosure. The subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order. While the present disclosure may be applied in the oil and gas industry, it is not limited thereto and may also be applied in other industries to achieve similar results.

Method Description

Referring now to FIG. 1, a flow diagram of one embodiment of a method 100 for implementing the present disclosure is illustrated. The method 100 presents an interactive approach to predefining elements of a cemented wellbore using a graphical user interface. Instead of the trial and error approach to defining the elements required for cementing the wellbore and making adjustments until the desired result is achieved, the method 100 starts with the desired result by predefining the elements required for a properly cemented wellbore. In this manner, the wellbore may be cemented knowing exactly which elements are required and where they must be placed in the wellbore and tubing string.

Figure 2:
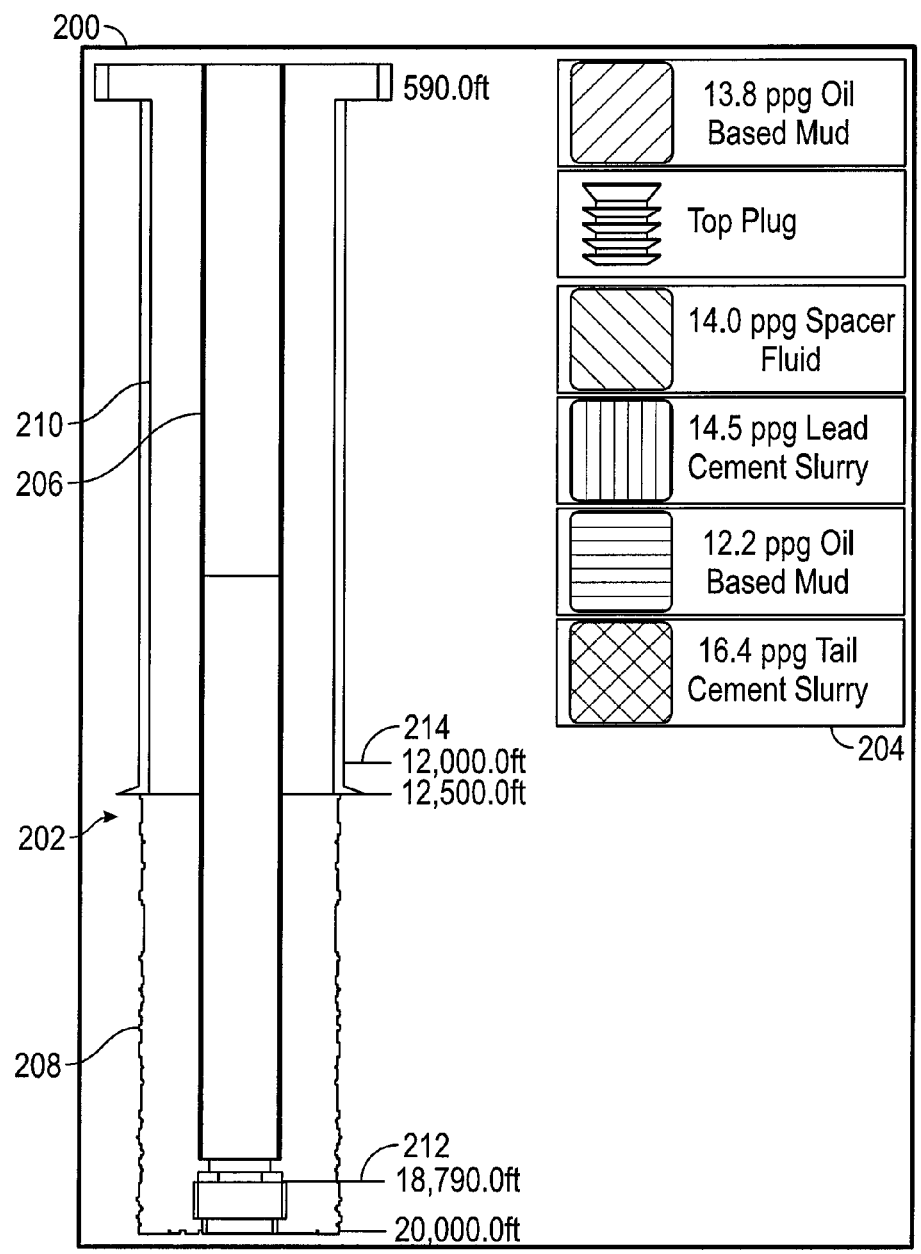
FIG. 2 is a display of a graphical user interface comprising various elements for cementing a wellbore and a schematic view of the wellbore and tubing string.

In FIG. 2, a display 200 of an exemplary graphical user interface comprising various elements for cementing a wellbore and a schematic view of the wellbore and tubing string is illustrated. The display 200 includes a schematic view 202 of the wellbore and various elements in a key 204 for cementing the wellbore. The elements in the key 204 include various coded fluids in pounds per gallon (ppg), which are constrained to different areas within the wellbore and tubing string, and a top plug. These fluids may be categorized as either cement, spacer, brine based mud, oil based mud, synthetic based mud and water based mud. The coded fluids in key 204 may be coded in any manner to quickly distinguish the type and density of the coded fluid. For example, two cement fluids with different densities may be color-coded with different shades of the same color to quickly distinguish the darker cement fluid with a higher density than the lighter cement fluid. The schematic view 202 includes the tubing string 206 to be cemented in the wellbore 208. The schematic view also includes the casing 210, the position of a float collar 212 (if present) in the tubing string 206 and the position of the desired top of cement 214 (if known).

The schematic view 202 includes three zones defined as the area within the tubing string 206 from its top to the float collar 212 (zone 1), the area within the tubing string 206 below the float collar 212 and within an annulus between the tubing string 206, the wellbore 208 and the casing 210 up to the top of cement 214 (zone 2), and the area within an annulus between the tubing string 206 and the casing 210 from the top of cement 214 to the top of the annulus (zone 3). The existence and size of each zone depends on the existence and position of the float collar 212 and the top of cement 214. Each zone may therefore, be adjusted or removed using the client interface and/or the video interface described further in reference to FIG. 3 to drag an end of the zone (e.g. float collar 212 and top of cement 214) to another position. If the depth of a zone is adjusted to zero, then it is removed. Each zone is initially unassigned, meaning empty, however, may be filled with one or more of the elements in the key 204 using the client interface and/or the video interface described further in reference to FIG. 3 to drag each element to a particular unassigned zone and fill it. Once filled, a zone is predefined by the assigned element. Adjacent zones assigned the same element (i.e. fluid) are merged into a single assigned zone. And, assigned zones may be labeled to indicate the depth of each end of an assigned zone and/or the volume of fluid an assigned zone represents.

In the following description of the method 100, reference is also made to the graphical user interface in FIG. 2.

Figure 3:
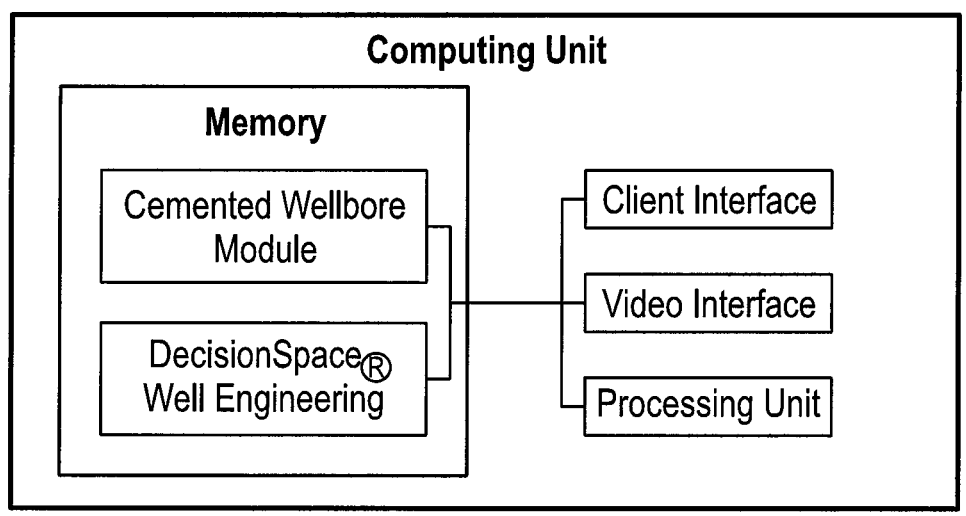
FIG. 3 is a block diagram illustrating one embodiment of a computer system for implementing the present disclosures.

In step 102, an element is selected from the key 204 using the client interface and/or the video interface described further in reference to FIG. 3.

In step 104, the method 100 determines if the selected element is a fluid using techniques well known in the art. If the selected element is a fluid, then the method 100 proceeds to step 108. If the selected element is not a fluid, then the method 100 proceeds to step 106.

In step 106, the top plug is dragged inside the tubing string 206 above a float collar 212 to any position between two zones (e.g. zone 1 and zone 2) using the client interface and/or the video interface described further in reference to FIG. 3 or the top plug may be removed from the tubing string 206. The top plug therefore, may already be positioned in the tubing string 206 or it may be the selected element from the key 204. The method 100 proceeds to step 113.

In step 108, the method 100 determines whether to drag the fluid to an unassigned zone based on, for example, the number of unassigned zones and/or erroneously assigned zones. If the fluid should be dragged to an unassigned zone, then the method 100 proceeds to step 112. If the fluid should not be dragged to an unassigned zone, then the method 100 proceeds to step 110.

In step 110, the fluid is dragged to an assigned zone in the schematic view 202 using the client interface and/or the video interface described further in reference to FIG. 3 where the assigned zone is half filled with the fluid. The other half of the assigned zone remains filled with a fluid already present. The method proceeds to step 113.

In step 112, the fluid is dragged to an unassigned zone (e.g. zone 1) in the schematic view 202 using the client interface and/or the video interface described further in reference to FIG. 3 where the unassigned zone is completely filled with the fluid.

In step 113, the method 100 determines whether to select another element based on, for example, the number of unassigned zones and/or erroneously assigned zones. If another element should be selected, then the method 100 returns to step 102. If another element should not be selected, then the method 100 proceeds to step 114.

In step 114, the method 100 determines whether to drag a fluid from an assigned zone based on, for example, the number of unassigned zones and/or erroneously assigned zones. If a fluid should be dragged from an assigned zone, then the method 100 proceeds to step 120. If a fluid should not be dragged from an assigned zone, then the method 100 proceeds to step 116.

In step 116, the method 100 determines whether to copy a fluid from an assigned zone based on, for example, the number of unassigned zones and/or erroneously assigned zones. If a fluid should not be copied from an assigned zone, then the method 100 ends. If a fluid should be copied from an assigned zone, then the method 100 proceeds to step 118.

In step 118, the fluid is copied from an assigned zone (e.g. zone 2) in the schematic view 202 using the client interface and/or the video interface described further in reference to FIG. 3. The method 100 returns to step 108 where the method 100 determines whether to drag the copied fluid to an unassigned zone or an assigned zone. The fluid copied from the assigned zone remains in the assigned zone.

In step 120, the fluid is dragged from an assigned zone (e.g. zone 2) in the schematic view 202 using the client interface and/or the video interface described further in reference to FIG. 3. The fluid is thus, completely removed from the assigned zone leaving the zone unassigned or assigned with another fluid that filled half the zone.

In step 122, the method 100 determines whether to drag the fluid removed in step 120 to another zone based on, for example, the number of unassigned zones and/or erroneously assigned zones. If the removed fluid should be dragged to another zone, then the method 100 returns to step 108 where the method 100 determines whether to drag the removed fluid to an unassigned zone or an assigned zone. If the removed fluid should not be dragged to another zone, then the method 100 returns to step 113 where the method 100 determines whether to select another element based on, for example, the number of unassigned zones and/or erroneously assigned zones.

The method 100 and graphical user interface in FIG. 2 therefore, provide immediate visual feedback for predefining the elements required for a properly cemented wellbore. The schematic view 202 also makes the process easier to understand and interpret.

System Description

The present disclosure may be implemented through a computer-executable program of instructions, such as program modules, generally referred to as software applications or application programs executed by a computer. The software may include, for example, routines, programs, objects, components and data structures that perform particular tasks or implement particular abstract data types. The software forms an interface to allow a computer to react according to a source of input. DecisionSpace Well Engineering®, which is a commercial software application marketed by Landmark Graphics Corporation, may be used as an interface application to implement the present disclosure. The software may also cooperate with other code segments to initiate a variety of tasks in response to data received in conjunction with the source of the received data. The software may be stored and/or carried on any variety of memory such as CD-ROM, magnetic disk, bubble memory and semiconductor memory (e.g. various types of RAM or ROM). Furthermore, the software and its results may be transmitted over a variety of carrier media such as optical fiber, metallic wire and/or through any of a variety of networks, such as the Internet.

Moreover, those skilled in the art will appreciate that the disclosure may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof, in a computer system or other processing system.

Referring now to FIG. 3, a block diagram illustrates one embodiment of a system for implementing the present disclosure on a computer. The system includes a computing unit, sometimes referred to as a computing system, which contains memory, application programs, a client interface, a video interface, and a processing unit. The computing unit is only one example of a suitable computing environment and is not intended to suggest any limitation as to the scope of use or functionality of the disclosure.

The memory primarily stores the application programs, which may also be described as program modules containing computer-executable instructions, executed by the computing unit for implementing the present disclosure described herein and illustrated in FIGS. 1-2. The memory therefore, includes a cemented wellbore module, which enables steps 102-122 described in reference to FIG. 1. The cemented wellbore module may integrate functionality from the remaining application programs illustrated in FIG. 3. In particular, DecisionSpace Well Engineering® may be used as an interface application to provide the graphical user interface in FIG. 2. Although DecisionSpace Well Engineering® may be used as interface application, other interface applications may be used, instead, or the cemented wellbore module may be used as a stand-alone application.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on, the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through an application program interface ("API") or cloud computing, which may reside on a separate computing unit connected through a computer system or network. For example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through the client interface that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well known.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A method for predefining elements of a cemented wellbore, comprising:
    selecting a fluid from a key comprising multiple fluids using a graphical user interface;

dragging the fluid from the key to one of a plurality of zones within a schematic view of a wellbore and a tubing string using the graphical user interface; and filling the one of the plurality of zones with the fluid or filling half of the one of the plurality of zones with the fluid using a computer processor.

2. The method of claim 1, further comprising:

selecting a top plug from the key using the graphical user interface; and dragging the top plug inside the tubing string above a float collar in the schematic view to any position between two of the plurality of zones or removing the top plug from the tubing string using the graphical user interface.

3. The method of claim 1, wherein each of the plurality of zones is assigned or unassigned.

4. The method of claim 3, wherein each assigned zone is filled with at least one of the multiple fluids and each unassigned zone is empty.

5. The method of claim 1, wherein the multiple fluids are coded to distinguish each fluid by type and density.

6. The method of claim 1, wherein the plurality of zones comprises:

a first zone defined as an area within the tubing string from a top of the tubing string to a float collar;

a second zone defined as an area within the tubing string below the float collar and within an annulus between the tubing string, the wellbore and casing up to a predetermined top of cement; and a third zone defined as an area within another annulus between the tubing string and the casing from the top of cement to a top of the another annulus.

7. The method of claim 1, further comprising repeating each step in claim 1 until each of the plurality of zones is filled with at least one of the multiple fluids.

8. The method of claim 4, further comprising:

filling the one of the plurality of zones with the fluid;

dragging another fluid from an assigned zone in the schematic view using the graphical user interface, wherein the another fluid is removed from the assigned zone; and dragging the another fluid to another one of the plurality of zones.

9. The method of claim 4, further comprising:

filling half of the one of the plurality of zones with the fluid;

copying another fluid from an assigned zone in the schematic view using the graphical user interface, wherein the fluid copied from the assigned zone remains in the assigned zone;

dragging the fluid copied from the assigned zone to an unassigned zone using the graphical user interface; and filling the unassigned zone with the fluid copied from the assigned zone.

10. A non-transitory program carrier device tangibly carrying computer executable instructions for predefining elements of a cemented wellbore, the instructions being executable to implement:

selecting a fluid from a key comprising multiple fluids using a graphical user interface;

dragging the fluid from the key to one of a plurality of zones within a schematic view of a wellbore and a tubing string using the graphical user interface; and filling the one of the plurality of zones with the fluid or filling half of the one of the plurality of zones with the fluid.

11. The program carrier device of claim 10, further comprising:

selecting a top plug from the key using the graphical user interface; and dragging the top plug inside the tubing string above a float collar in the schematic view to any position between two of the plurality of zones or removing the top plug from the tubing string using the graphical user interface.

12. The program carrier device of claim 10, wherein each of the plurality of zones is assigned or unassigned.

13. The program carrier device of claim 12, wherein each assigned zone is filled with at least one of the multiple fluids and each unassigned zone is empty.

14. The program carrier device of claim 10, wherein the multiple fluids are coded to distinguish each fluid by type and density.

15. The program carrier device of claim 10, wherein the plurality of zones comprises:

a first zone defined as an area within the tubing string from a top of the tubing string to a float collar;

a second zone defined as an area within the tubing string below the float collar and within an annulus between the tubing string, the wellbore and casing up to a predetermined top of cement; and a third zone defined as an area within another annulus between the tubing string and the casing from the top of cement to a top of the another annulus.

16. The program carrier device of claim 10, further comprising repeating each step in claim 10 until each of the plurality of zones is filled with at least one of the multiple fluids.

17. The program carrier device of claim 13, further comprising:

filling the one of the plurality of zones with the fluid;

dragging another fluid from an assigned zone in the schematic view using the graphical user interface, wherein the another fluid is removed from the assigned zone; and dragging the another fluid to another one of the plurality of zones.

18. The program carrier device of claim 13, further comprising:

filling half of the one of the plurality of zones with the fluid;

copying another fluid from an assigned zone in the schematic view using the graphical user interface, wherein the fluid copied from the assigned zone remains in the assigned zone;

dragging the fluid copied from the assigned zone to an unassigned zone using the graphical user interface; and filling the unassigned zone with the fluid copied from the assigned zone.

19. A non-transitory program carrier device for carrying a data structure, the data structure, comprising:

a first data field comprising a schematic view of a wellbore and a tubing string, wherein the schematic view comprises:

a first zone defined as an area within the tubing string from a top of the tubing string to a float collar;

a second zone defined as an area within the tubing string below the float collar and within an annulus between the tubing string, the wellbore and casing up to a predetermined top of cement; and a third zone defined as an area within another annulus between the tubing string and the easing from the top of cement to a top of the another annulus; and a second data field comprising a key with multiple fluids, wherein the multiple fluids are coded to distinguish each fluid by type and density.

20. The program carrier device of claim 19, wherein the first data field is interactive with the second data field to fill each zone in the schematic view with at least one of the multiple fluids.

\* \* \* \* \*